(12) United States Patent
Shin et al.

(10) Patent No.: US 9,753,214 B2
(45) Date of Patent: Sep. 5, 2017

(54) LIGHT SOURCE UNIT, METHOD OF FABRICATING THE LIGHT SOURCE UNIT AND BACKLIGHT ASSEMBLY INCLUDING THE LIGHT SOURCE UNIT

(71) Applicant: Samsung Display Co., Ltd., Yongin, Gyeonggi-Do (KR)

(72) Inventors: Myeong Ju Shin, Seoul (KR); Seung Hwan Baek, Seoul (KR); Yeong Bae Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 401 days.

(21) Appl. No.: 14/320,989

(22) Filed: Jul. 1, 2014

(65) Prior Publication Data

US 2015/0285985 A1 Oct. 8, 2015

(30) Foreign Application Priority Data

Apr. 2, 2014 (KR) .................. 10-2014-0039403

(51) Int. Cl.
  *G09F 13/04* (2006.01)
  *F21V 8/00* (2006.01)
  *B82Y 20/00* (2011.01)

(52) U.S. Cl.
  CPC .......... *G02B 6/0073* (2013.01); *G02B 6/009* (2013.01); *G02B 6/0026* (2013.01); *B82Y 20/00* (2013.01); *Y10S 977/774* (2013.01); *Y10T 29/49018* (2015.01)

(58) Field of Classification Search
  CPC .. G02B 6/0073; G02B 6/0026; G02B 6/0078; Y10S 977/774; Y01T 29/49018; H01L 25/0753; F21K 9/54; F21K 9/56; F21K 9/58
  See application file for complete search history.

(56) References Cited

U.S. PATENT DOCUMENTS

| | | | |
|---|---|---|---|
| 7,819,539 B2 | 10/2010 | Kim et al. | |
| 8,162,498 B2 | 4/2012 | Ramer et al. | |
| 8,227,828 B2 | 7/2012 | Li et al. | |
| 8,362,507 B2 | 1/2013 | Weber | |
| 2007/0273274 A1* | 11/2007 | Horiuchi ................ | C09K 11/06 313/504 |

(Continued)

FOREIGN PATENT DOCUMENTS

| JP | 2009071005 A | * | 4/2009 |
|---|---|---|---|
| JP | 2013-026485 | | 2/2013 |

(Continued)

*Primary Examiner* — Y M. Lee
(74) *Attorney, Agent, or Firm* — Innovation Counsel LLP

(57) ABSTRACT

A light source unit, a method of fabricating the light source unit and a backlight assembly including the light source unit are provided. According to an exemplary embodiment of the inventive concept, there is provided a light source unit, comprising a circuit board, a light-emitting diode ("LED") package configured to be disposed on the circuit board and including an LED chip emitting light, a wavelength conversion member configured to be disposed on the LED package and convert the wavelength of light emitted from the LED chip, and a mold member configured to be interposed between the LED package and the wavelength conversion member and support the wavelength conversion member.

17 Claims, 22 Drawing Sheets

(56) References Cited

U.S. PATENT DOCUMENTS

| | | | |
|---|---|---|---|
| 2008/0310158 A1* | 12/2008 | Harbers et al. | F21K 9/54 362/240 |
| 2011/0037091 A1 | 2/2011 | Fushimi | |
| 2011/0096526 A1* | 4/2011 | Katabe | H01L 33/507 362/84 |
| 2011/0309325 A1 | 12/2011 | Park et al. | |
| 2012/0250351 A1 | 10/2012 | Shin et al. | |
| 2012/0313075 A1 | 12/2012 | Linton et al. | |
| 2013/0016499 A1 | 1/2013 | Yee et al. | |
| 2015/0062907 A1* | 3/2015 | Ng | F21K 9/56 362/293 |
| 2015/0261076 A1* | 9/2015 | Dijken | H01L 33/507 362/84 |

FOREIGN PATENT DOCUMENTS

| | | |
|---|---|---|
| JP | 2013-065812 | 4/2013 |
| JP | 5197368 | 5/2013 |
| JP | 2013-115351 | 6/2013 |
| JP | 2013-183124 | 9/2013 |
| KR | 10-0951843 | 4/2010 |
| KR | 10-1022540 | 3/2011 |
| KR | 10-2012-0059061 | 6/2012 |
| KR | 10-1156096 | 6/2012 |
| KR | 10-2012-0075015 | 7/2012 |
| KR | 10-2012-0135999 | 12/2012 |
| KR | 10-2013-0036449 | 4/2013 |
| KR | 10-1299674 | 8/2013 |

* cited by examiner

LIGHT SOURCE UNIT, METHOD OF FABRICATING THE LIGHT SOURCE UNIT AND BACKLIGHT ASSEMBLY INCLUDING THE LIGHT SOURCE UNIT

This application claims priority to Korean Patent Application No. 10-2014-0039403 filed on Apr. 2, 2014 in the Korean Intellectual Property Office, the disclosure of which is incorporated herein by reference in its entirety.

BACKGROUND

1. Field

The inventive concept relates to a light source unit, a method of fabricating the light source unit and a backlight assembly including the light source unit.

2. Description of the Related Art

Display devices are devices for visually displaying image data. Examples of display devices include a liquid crystal display ("LCD"), an electrophoretic display, an organic light-emitting diode ("OLED") display, an inorganic electroluminescent ("EL") display, a field emission display ("FED"), a surface-conduction electron-emitter display ("SED"), a plasma display and a cathode ray tube ("CRT") display.

An LCD, which is a type of display device, includes a liquid crystal layer disposed between two transparent substrates and displays an image by driving the liquid crystal layer so as to adjust the optical transmittance of the liquid crystal layer in pixels.

Since the liquid crystal layer cannot emit light, a light source unit is provided in the LCD, and contrast is realized by adjusting the intensity of light transmitted through the liquid crystal layer. More specifically, the light source unit is installed in a backlight assembly, which is an important part of the LCD for determining the quality of an image displayed by the LCD, such as luminance and uniformity.

The light source unit, which is used in the backlight assembly, may include a light source emitting blue light and a phosphor disposed on the light source and transforming blue light into white light, and may thus be able to provide white light to the liquid crystal layer.

However, there is a limit in improving the color purity of light simply by using typical phosphors.

Quantum dots may be used, instead of typical phosphors, to convert the wavelength of light emitted from a light source. Quantum dots are nano-crystals formed of a semiconductor material and exhibit quantum confinement effects. Since quantum dots emit more intense light within a narrow wavelength band than typical phosphors, the color purity of light emitted from a light source unit can be further improved.

However, when quantum dots are disposed near a light source, they may deteriorate due to heat from the light source, and thus need to be placed away from the light source more than a predetermined distance.

Also, since quantum dots are highly expensive, the manufacturing cost of a display device including a backlight assembly with quantum dots formed integrally at the front of a light source unit is generally high. Accordingly, a method is needed to provide quantum dots only at places necessary.

SUMMARY

Exemplary embodiments of the inventive concept provide a light source unit in which quantum dots are placed a predetermined distance from a light source and are provided only at places necessary.

Exemplary embodiments of the inventive concept also provide a method of fabricating a light source unit in which quantum dots are placed a predetermined distance from a light source and are provided only at places necessary.

Exemplary embodiments of the inventive concept also provide a backlight assembly including a light source unit in which quantum dots are placed a predetermined distance from a light source and are provided only at places necessary.

However, exemplary embodiments of the inventive concept are not restricted to those set forth herein. The above and other exemplary embodiments of the inventive concept will become more apparent to one of ordinary skill in the art to which the inventive concept pertains by referencing the detailed description of the inventive concept given below.

According to an exemplary embodiment of the inventive concept, there is provided a light source unit, comprising a circuit board, a light-emitting diode ("LED") package configured to be disposed on the circuit board and including an LED chip emitting light, a wavelength conversion member configured to be disposed on the LED package and convert the wavelength of light emitted from the LED chip, and a mold member configured to be interposed between the LED package and the wavelength conversion member and support the wavelength conversion member.

The mold member may include a first opening disposed between the circuit board and the wavelength conversion member and the first opening accommodates the LED package therein.

The LED package may further include a package mold disposed on the circuit board and the package mold includes a receiving groove receiving the LED chip.

The mold member may further include a second opening disposed between the first opening and the wavelength conversion member, the second opening extending from the first opening, and a side surface of the second opening and a side surface of the receiving groove exist on a substantially same plane.

The mold member may further include a third opening disposed above the second opening and extending from the second opening and the third opening accommodates the wavelength conversion member therein.

The LED chip may emit blue light.

The wavelength conversion member may include quantum dots.

The wavelength conversion member may convert light emitted from the LED chip into white light.

The wavelength conversion member may include a first substrate disposed on the mold member, a second substrate disposed on the first substrate, and a wavelength conversion layer disposed between the first substrate and the second substrate corresponding to the receiving groove.

At least one of the first substrate and the second substrate may include a recess pattern disposed above the LED chip and the wavelength conversion layer is located in the recess pattern.

The wavelength conversion member may further include a sealant disposed between the first substrate and the second substrate and surrounding the wavelength conversion layer.

The light source unit may further comprise a fixing member configured to be disposed along edges of the mold member and the wavelength conversion member and fix the wavelength conversion member to the mold member.

According to another exemplary embodiment of the inventive concept, there is provided a method of fabricating a light source unit, comprising placing an LED package, which includes an LED chip emitting light, on a circuit board, inserting a mold member into the LED package, and inserting a wavelength conversion member, which converts the wavelength of light emitted from the LED chip, into the mold member.

The method of fabricating a light source unit may further comprise after the placing the LED package, mounting the LED package on the circuit board.

The method of fabricating a light source unit may further comprise after the inserting the mold member, mounting the LED package and the mold member at the same time on the circuit board.

The method of fabricating a light source unit may further comprise before the inserting the wavelength conversion member, preparing the wavelength conversion member, wherein the preparing the wavelength conversion member, comprises, forming a plurality of recess patterns on a first mother substrate, the recess patterns being arranged in a matrix, and filling the recess patterns with a wavelength conversion material including quantum dots.

The preparing the wavelength conversion member, may further comprise forming a sealing member in a lattice pattern on a second mother substrate, and combining the first mother substrate and the second mother substrate by interposing the sealing member therebetween. Each of the recess patterns is surrounded by the sealing member.

The preparing the wavelength conversion member, may further comprise applying laser beams to the sealing member, and cutting the first mother substrate and the second mother substrate along the middle of each part of the sealing member.

According to still another exemplary embodiment of the inventive concept, there is provided a backlight assembly, comprising, a light source unit configured to emit light, and a container configured to accommodate the light source unit therein, wherein the light source unit comprises, a circuit board configured to be disposed on the container, an LED package configured to be disposed on the circuit board and including an LED chip emitting light, a wavelength conversion member configured to be disposed on the LED package and convert the wavelength of light emitted from the LED chip, and a mold member configured to be interposed between the LED package and the wavelength conversion member and support the wavelength conversion member.

The backlight assembly may further comprise a light guide panel or a diffusion plate configured to be disposed above the light source unit.

According to the exemplary embodiments of the inventive concept, since quantum dots are provided in a light source unit, it is possible to provide high-purity white light.

Also, since the quantum dots are placed a predetermined distance from a light source, the quantum dots can be prevented from deteriorating due to heat generated from the light source.

Also, since the quantum dots are provided only at a place corresponding to the light source, the manufacturing cost of the light source unit can be reduced.

Other features and exemplary embodiments will be apparent from the following detailed description, the drawings, and the claims.

DETAILED DESCRIPTION OF THE EMBODIMENTS

Figure 1:
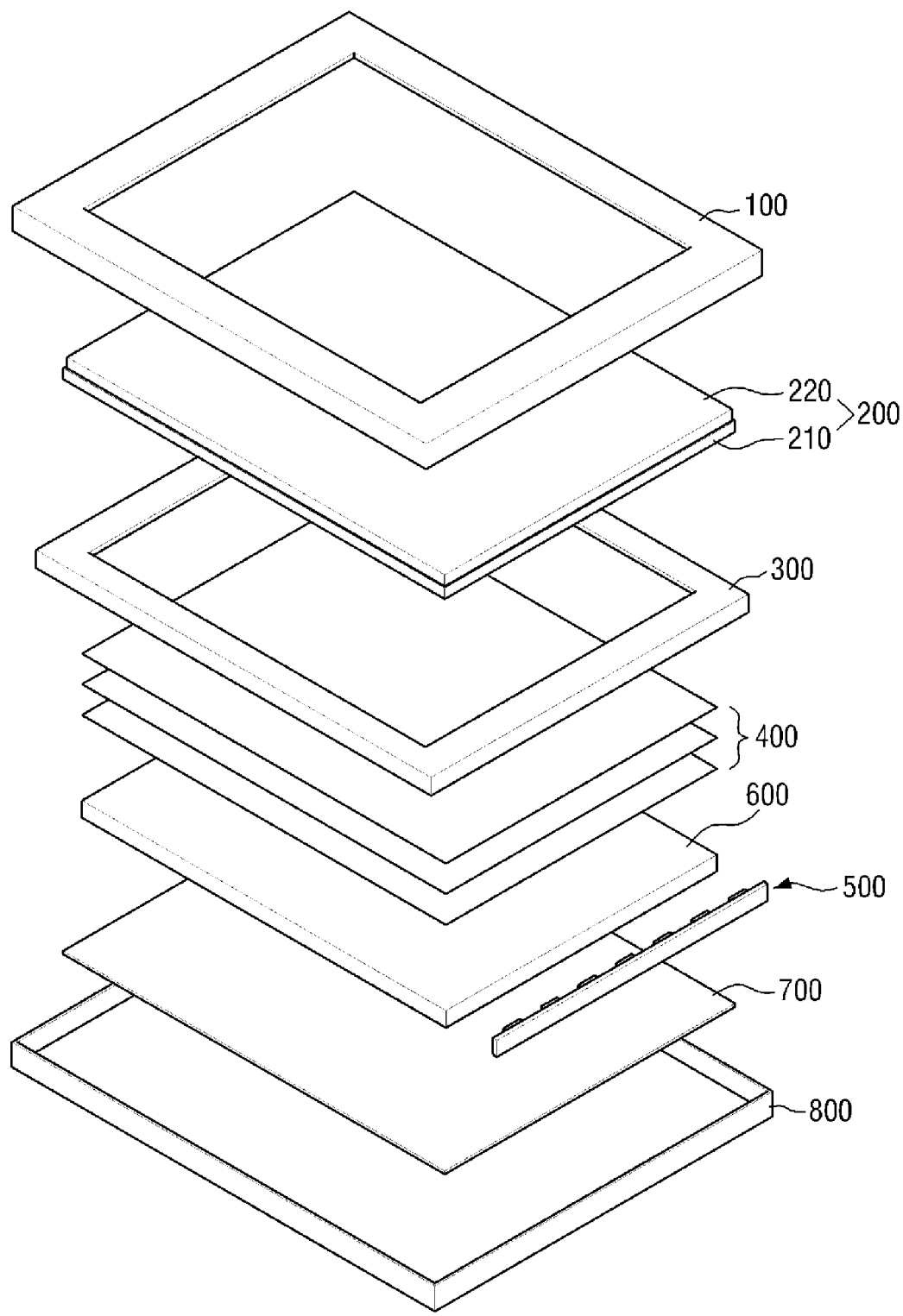
FIG. 1 is an exploded perspective view of a display device according to an exemplary embodiment of the inventive concept.

The aspects and features of the present inventive concept and methods for achieving the aspects and features will be apparent by referring to the embodiments to be described in detail with reference to the accompanying drawings. However, the present inventive concept is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the inventive concept, and the present inventive concept is only defined within the scope of the appended claims.

The term "on" that is used to designate that an element is on another element or located on a different layer or a layer includes both a case where an element is located directly on another element or a layer and a case where an element is located on another element via another layer or still another element. In the entire description of the present inventive concept, the same drawing reference numerals are used for the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Exemplary embodiments of the inventive concept will hereinafter be described with reference to the accompanying drawings.

FIG. 1 is an exploded perspective view of a display device according to an exemplary embodiment of the inventive concept. Referring to FIG. 1, a display device according to an exemplary embodiment includes a display panel 200, a backlight assembly, a top chassis 100 and a bottom chassis 800.

The display panel 200, which is a panel displaying an image, may be a liquid crystal display ("LCD") panel, an electrophoretic display panel, an organic light-emitting diode ("OLED") panel, a light-emitting diode ("LED") panel, an inorganic electroluminescent ("EL") display panel, a field emission display ("FED") panel, a surface-conduction electron-emitter display ("SED") panel, a plasma display panel ("PDP") or a cathode ray tube ("CRT") display panel. In the description that follows, it is assumed that the display panel 200 is an LCD panel, but the inventive concept is not limited thereto. That is, the inventive concept can be applied to various display devices or panels, other than an LCD device or panel.

The display panel 200 may include a first display substrate 210, a second display substrate 220 facing the first display substrate 210, and a liquid crystal layer (not illustrated) interposed between the first display substrate 210 and the second display substrate 220. The first display substrate 210 and the second display substrate 220 may be formed as cuboids. The first display substrate 210 and the second display substrate 220 are illustrated in FIG. 1 as being cuboids, but the inventive concept is not limited thereto. That is, the first display substrate 210 and the second display substrate 220 may be formed in various other shapes, conforming to the shape of the display device.

The backlight assembly may be disposed below the display panel 200. The backlight assembly may provide light to the display panel 200. In the description that follows, it is assumed that the backlight assembly is an edge-type backlight assembly in which a light source unit 500 is disposed on one side surface of a light guide panel 600, but the inventive concept is not limited thereto. That is, the inventive concept can be applied to a direct-type backlight assembly in which the light source unit 500 is disposed on the bottom surface of a diffusion plate.

The backlight assembly may include the light source unit 500, the light guide panel 600, one or more optical sheets 400, a reflection plate 700 and a mold frame 300.

The light source unit 500 may generate light and may apply the light to the light guide panel 600. The light source unit 500 may be disposed on one side surface of the light guide panel 600, i.e., on a light incidence surface of the light guide panel 600. In an exemplary embodiment, the light source unit 500 may be disposed to correspond to one of the short sides of the light guide panel 600, but the inventive concept is not limited thereto. That is, the light source unit 500 may be disposed to correspond to one of the long sides of the light guide panel 600. The light source unit 500 will be described later in further detail.

The light guide panel 600 may be disposed on one side of the light source unit 500. The light guide panel 600 may be disposed substantially on a same plane with the light source unit 500. The light guide panel 600 may guide the light applied thereto by the light source unit 500 toward the display panel 200.

The light guide panel 600 may be formed of a transparent material. In an exemplary embodiment, the light guide panel 600 may be formed of polymethyl methacrylate ("PMMA"), but the inventive concept is not limited thereto. That is, the light guide panel 600 may be formed of various other materials capable of guiding light. In an exemplary embodiment, the light guide panel 600 may be formed of a rigid material, but the inventive concept is not limited thereto. In an alternative exemplary embodiment, the light guide panel 600 may be formed of a flexible material.

The light guide panel 600 may have a rectangular plate. In the description that follows, it is assumed that the light guide panel 600 has a rectangular plate, but the inventive concept is not limited thereto. That is, the light guide panel 600 may be formed in various other shapes.

The optical sheets 400 may be disposed on the light guide panel 600. The optical sheets 400 may modulate the optical properties of light emitted from a light exit surface of the light guide panel 600. More than one optical sheet 400 may be provided in the display device, and may be deposited on one another to complement one another. In an exemplary embodiment, the optical sheets 400 may include at least one prism sheet or diffusion sheet.

The reflection plate 700 may be disposed below the light guide panel 600. The reflection plate 700 may reflect light emitted from the light source unit 500 toward the bottom chassis 800 so as for the light to travel back toward the light guide panel 600. The reflection plate 700 may be formed of a reflective material, for example, a metal.

The mold frame 300 may be disposed between the display panel 200 and the optical sheets 400. The mold frame 300 may be fitted to the bottom chassis 800, and may thus fix the light source unit 500, the light guide panel 600, the optical sheets 400 and the reflection plate 700. The mold frame 300 may be placed in contact with the edges of the display panel 200, and may thus support and fix the display panel 200.

The top chassis 100 may cover the edges of the display panel 200, and may surround the sides of the display panel 200 and the backlight assembly. The bottom chassis 800 may accommodate the backlight assembly therein. The top chassis 100 and the bottom chassis 800 may be fitted to each other, and may thus surround the display panel 200 and the backlight assembly together. The top chassis 100 and the bottom chassis 800 may be formed of a conductive material, for example, a metal.

Figure 2:
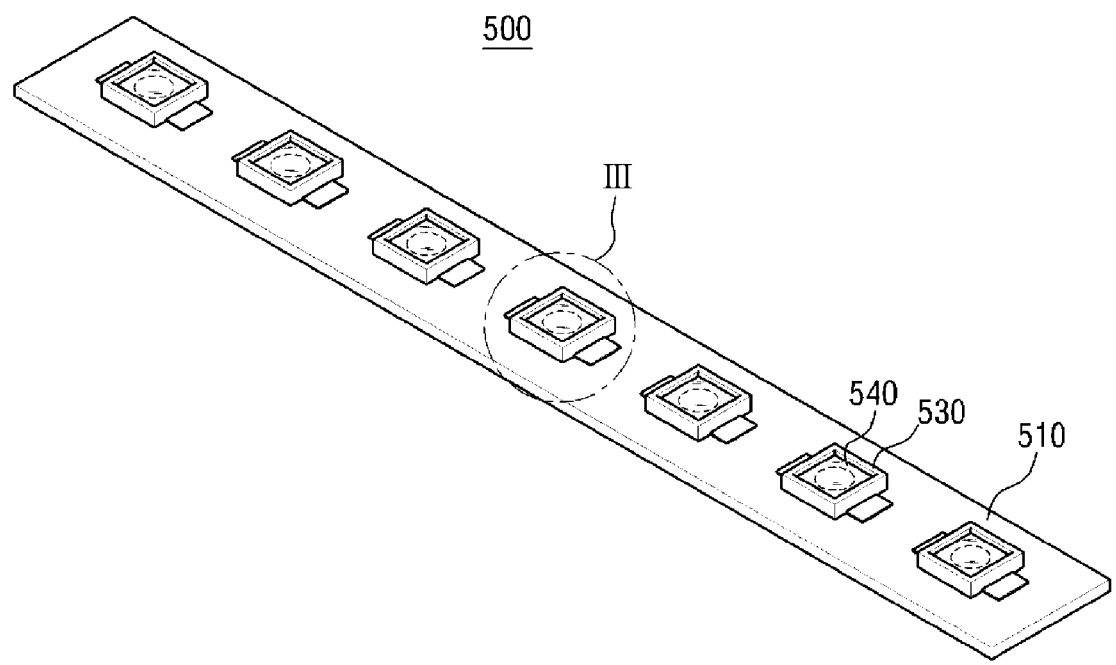
FIG. 2 is a perspective view of a light source unit illustrated in FIG. 1.
Figure 3:
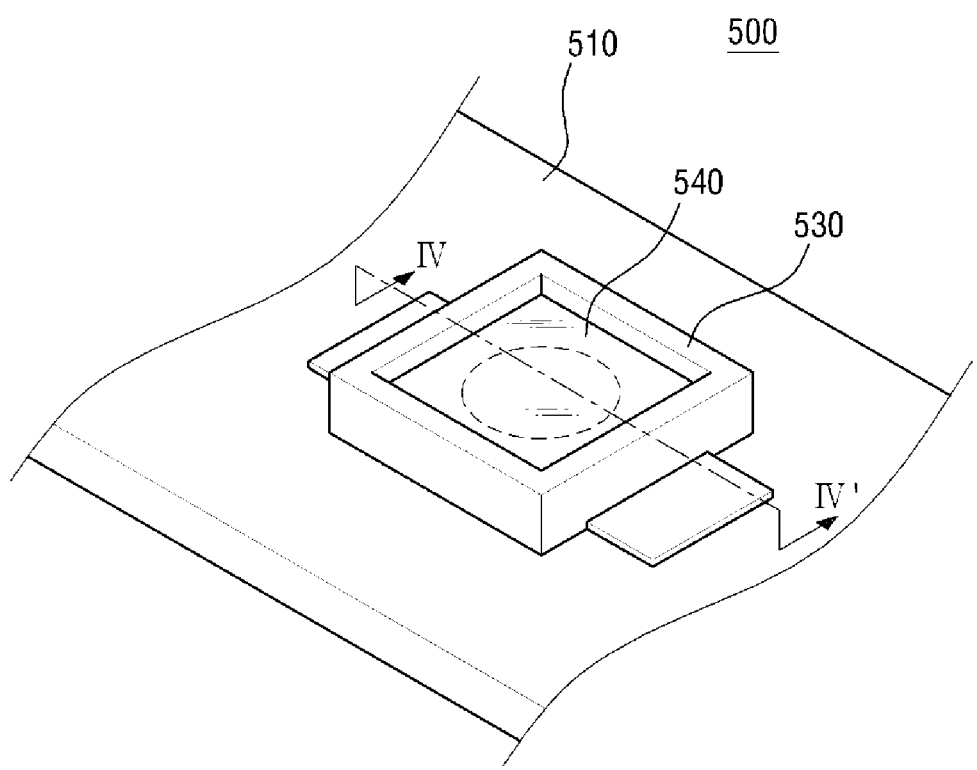
FIG. 3 is an enlarged perspective view of portion III of FIG. 2.
Figure 4:
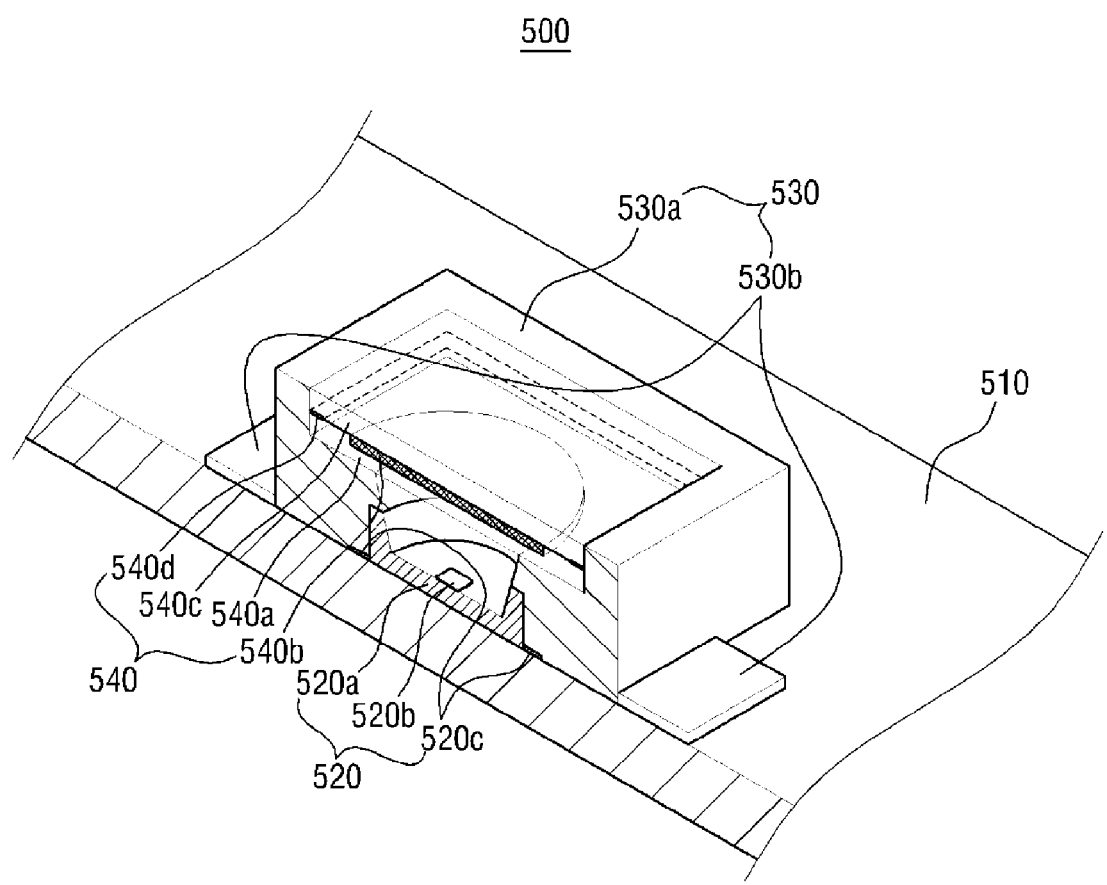
FIGS. 4 and 5 are a cross-sectional perspective view and a cross-sectional view, respectively, taken along line IV-IV' of FIG. 3.
Figure 5:
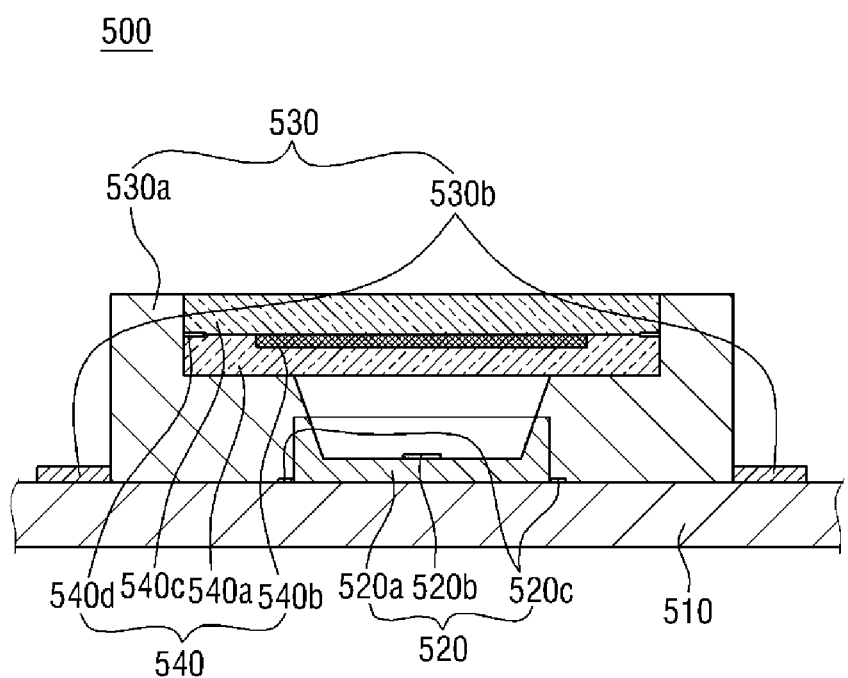

The light source unit 500 will hereinafter be described with reference to FIGS. 2 to 5. FIG. 2 is a perspective view of the light source unit 500, FIG. 3 is an enlarged perspective view of portion III of FIG. 2, and FIGS. 4 and 5 are a cross-sectional perspective view and a cross-sectional view, respectively, taken along line IV-IV' of FIG. 3.

Referring to FIGS. 2 to 5, the light source unit 500 includes a circuit board 510, one or more LED packages 520, one or more mold members 530 and one or more wavelength conversion members 540.

The circuit board 510 may be disposed on the light incidence surface of the light guide panel 600. The circuit board 510 may be connected to a power source (not illustrated), and may transmit electrical energy to the LED packages 520. The shape of a first surface of the circuit board 510 facing the light incident surface of the light guide panel 600 may correspond to the shape of the light incident surface of the light guide panel 600. In an exemplary embodiment, the first surface of the circuit board 510 may be parallel to the light incident surface of the light guide panel 600, and may have substantially the same area as the light incident surface of the light guide panel 600.

The LED packages 520 may be disposed on the first surface of the circuit board 510 facing the light incident surface of the light guide panel 600. The LED packages 520 may be disposed between the circuit board 510 and the mold members 530. In an exemplary embodiment, more than one LED package 520 may be provided on the circuit board 510. In this exemplary embodiment, the LED packages 520 may be a predetermined distance apart from one another. The LED packages 520 may be arranged in a row. The LED packages 520 may be arranged to correspond to the shape of the light incident surface of the light guide panel 600.

Figure 6:
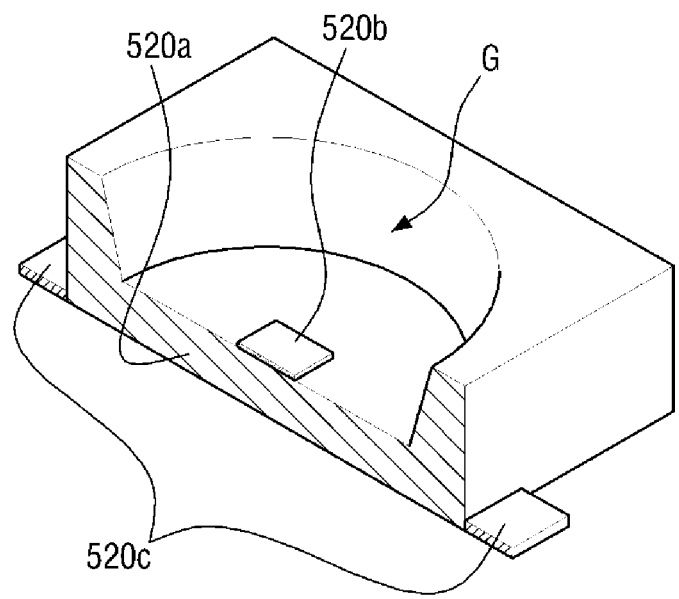
FIG. 6 is a cross-sectional perspective view of a light-emitting diode ("LED") package of the light source unit of FIG. 3.

The LED packages 520 will hereinafter be described in further detail with reference to FIG. 6. FIG. 6 is a cross-sectional perspective view of an LED package 520 of the light source unit 500.

Referring to FIG. 6, the LED package 520 may include a package mold 520a, an LED chip 520b and one or more first lead frames 520c.

The package mold 520a, which is a mold for accommodating the LED chip 520b therein, may be disposed directly on the circuit board 510.

The package mold 520a may be formed of a polymer material. In an exemplary embodiment, the package mold 520a may include at least one of poly-cyclohexylenedimethylene terephthalate ("PCT") and an epoxy molding compound ("EMC"). In another exemplary embodiment, the package mold 520a may include an organic material with excellent light stability such as a silicon resin, an acrylic resin, a fluoride resin or an imide resin, or an inorganic material with excellent light stability such as glass or silica gel. In another exemplary embodiment, the package mold 520a may include a heat-resistant resin so as not to melt due to heat generated during the fabrication of the package mold 520a. In this exemplary embodiment, the package mold 520a may also include various fillers such as aluminum nitride, aluminum oxide and a mixture thereof to relieve the thermal stress on the heat-resistant resin.

The package mold 520a may have a receiving groove G for receiving the LED chip 520b. The receiving groove G may be disposed on the package mold 520a. More specifically, the receiving groove G may be defined by a bottom surface, which is parallel to the surface of the circuit board 510, and a side surface, which extends from the bottom surface. The bottom surface and the side surface of the receiving groove G may form an obtuse angle with each other.

The LED chip 520b may be disposed on the package mold 520a. More specifically, the LED chip 520b may be located at the center of the bottom surface of the receiving groove G of the package mold 520a.

The LED chip 520b may receive power supplied by an external power source from the circuit board 510, and may thus emit light. In an exemplary embodiment, the LED chip 520b may emit blue light, but the inventive concept is not limited thereto.

The LED chip 520b may include a substrate (not illustrated), an N-type semiconductor layer (not illustrated), a P-type semiconductor layer (not illustrated), an active layer (not illustrated), an N-type electrode (not illustrated) and a P-type electrode (not illustrated). A sapphire substrate may be used as the substrate of the LED chip 520b. The N-type semiconductor layer and the P-type semiconductor layer may be formed of a nitride semiconductor such as GaN, AlGaN, InGaN, AlN, or AlInGaN. The active layer, which is formed between the N-type semiconductor layer and the P-type semiconductor layer and emits light, may be formed to have a multi-quantum well ("MQW") structure in which an InGaN layer is provided as a well and a GaN layer is provided as a barrier layer. The N-type electrode may be connected to the N-type semiconductor layer, and the P-type electrode may be connected to the P-type semiconductor layer. Various well-known modifications may be made to the structure of the LED chip 520b without departing from the scope of the inventive concept.

The first lead frames 520c may be disposed at a lower part of the package mold 520a. The first lead frames 520c may be formed of a conductive material. In an exemplary embodiment, two first lead frames 520c may be provided on the lower right side and the lower left side, respectively, of the package mold 520a. The first lead frames 520c may be connected to an external power source, and may be connected to the N-type electrode and the P-type electrode, respectively, of the LED chip 520b. The first lead frames 520c may fix the package mold 520a onto the circuit board 510.

Referring back to FIGS. 2 to 5, the mold members 530 may be disposed on the LED packages 520. That is, the mold members 530 may cover the LED packages 520. More specifically, the LED packages 520 may be surrounded by the mold members 530. More than one mold member 530 may be provided in the light source unit 500. Each of the mold members 530 may cover respective LED chips 520.

The length, width and height of the mold members 530 may be about 10 mm, about 10 mm and about 3 mm so as for the mold members 530 to completely cover the LED packages 520 and fully convert the wavelength of light emitted from the LED packages 520, but the inventive concept is not limited thereto. That is, the size of the mold members 530 may vary depending on the size of the LED packages 520.

Figure 7:
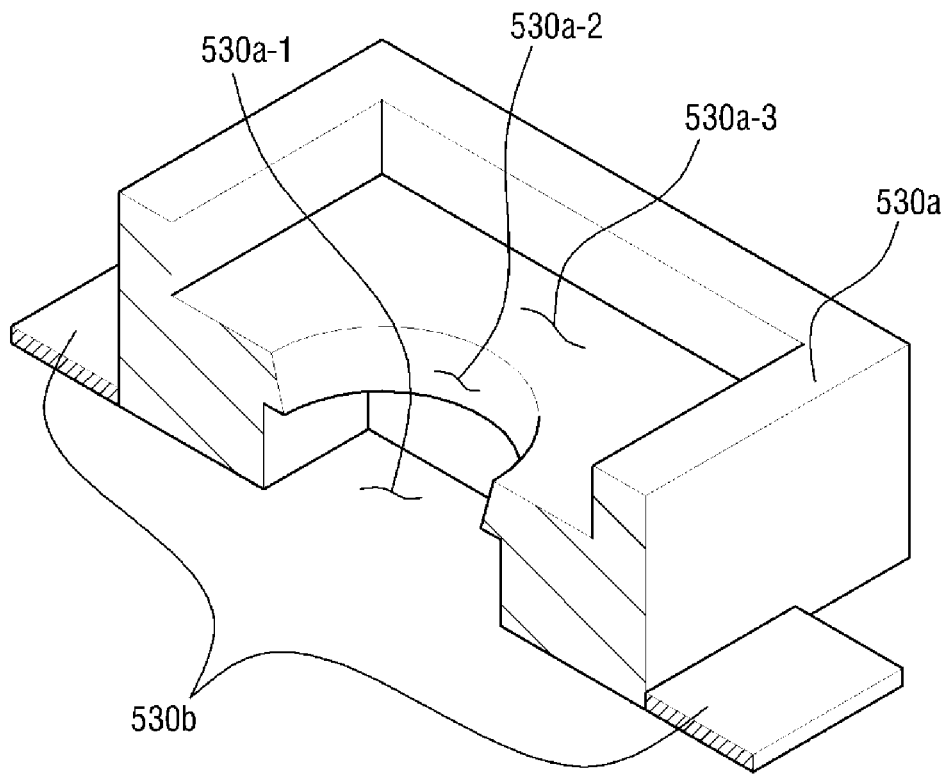
FIG. 7 is a cross-sectional perspective view of a mold member illustrated in FIG. 3.

The mold members 530 will hereinafter be described in further detail with reference to FIG. 7. FIG. 7 is a cross-sectional perspective view of a mold member 530 of the light source unit 500.

Referring to FIG. 7, the mold member 530 may include a base 530a and one or more second lead frames 530b.

The base 530a, which is a mold for covering an LED package 520 and supporting a wavelength conversion member 540, may be disposed directly on the circuit board 510 or the LED package 520. More specifically, the base 530a may directly contact all the sides of the LED package 520 and part of the top surface of the LED package 520. The base 530a may also directly contact all the side surfaces of the wavelength conversion member 540 and part of the bottom surface of the wavelength conversion member 540.

The base 530a may be formed of a polymer material. In an exemplary embodiment, the base 530a may include at least one of PCT and an EMC. In another exemplary embodiment, the base 530a may include an organic material with excellent light stability such as a silicon resin, an acrylic resin, a fluoride resin or an imide resin, or an inorganic material with excellent light stability such as glass or silica gel. In another exemplary embodiment, the base 530a may include a heat-resistant resin so as not to melt due to heat generated during the fabrication of the package mold 520a. In this exemplary embodiment, the base 530a may also include various fillers such as aluminum nitride, aluminum oxide and a mixture thereof to relieve the thermal stress on the heat-resistant resin. In another exemplary embodiment, the base 530a may be formed of the same material(s) as the package mold 520a.

The base 530a may include a first opening 530a-1, a second opening 530a-2 and a third opening 530a-3.

The first opening 530a-1 may be disposed at the bottom of the base 530a. The first opening 530a-1 may be located between the circuit board 510 and the wavelength conversion member 540. The shape of the first opening 530a-1 may correspond to the shape of the LED package 520. The first opening 530a-1 may accommodate the LED package 520 therein. That is, the LED package 520 may be inserted in the first opening 530a-1.

The second opening 530a-2 may be disposed in the middle of the base 530a. The second opening 530a-2 may be formed to extend from the first opening 530a-1. The second opening 530a-2 may be located between the first opening 530a-1 and the wavelength conversion member 540. The second opening 530a-2 may accommodate air or an inert gas therein. The second opening 530a-2 has an upper portion and a lower portion. The upper portion has an area wider than that of the lower portion. The side surface of the second opening 530a-2 and the side surface of the receiving groove G of the LED package 520 may exist on a substantially same plane. In other word, the side surface of the receiving groove G of the LED package 520 and the side surface of the second opening 530a-2 are in the same plane. The line connecting the bottom of the receiving groove G of the LED package 520 and the upper portion may form a straight line.

The third opening 530a-3 may be disposed at the top of the base 530a. The third opening 530a-3 may be formed to extend from the second opening 530a-2. The size of the third opening 530a-3 may be larger than the size of the first opening 530a-1 or the second opening 530a-2. That is, a central part of the third opening 530a-3 may overlap with the first opening 530a-1 and the second opening 530a-2, and an edge part of the third opening 530a-3 may not overlap with the first opening 530a-1 and the second opening 530a-2. The shape of the third opening 530a-3 may correspond to the shape of the wavelength conversion member 540. The third opening 530a-3 may accommodate the wavelength conversion member 540 therein. That is, the wavelength conversion member 540 may be inserted in the third opening 530a-3.

The second lead frames 530b may be disposed at a lower part of the base 530a. The second lead frames 530b may be formed of a conductive material. The second lead frames 530b may be formed of the same material as the first lead frame 520c. In an exemplary embodiment, two second lead frames 530b may be provided on the lower right side and the lower left side, respectively, of the base 530a. The second lead frames 530b may be formed to correspond to the first lead frames 520c. No electric field may be applied to the second lead frames 530b, whereas the first lead frames 520c may be supplied with power from an external power source. The second lead frames 530b may fix the base 530a onto the circuit board 510.

Referring back to FIGS. 2 to 5, the wavelength conversion members 540 may be disposed on the mold members 530. More specifically, the wavelength conversion members 540 may be disposed in the third openings 530a-3 of the mold members 530. The wavelength conversion members 540 may convert the wavelength of light emitted from the LED chips 520b. More than one wavelength conversion member 540 may be provided in the light source unit 500. Each of the wavelength conversion members 540 may be attached to respective mold members 530. The wavelength conversion members 540 may be fixed onto the respective mold members 530 by an adhesive (not illustrated).

Figure 8:
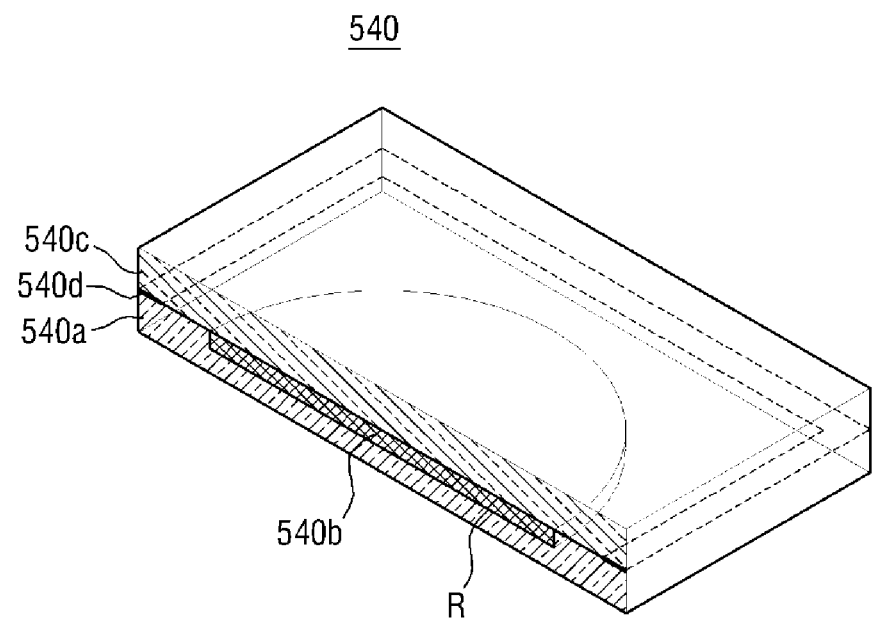
FIG. 8 is a cross-sectional perspective view of a wavelength conversion member illustrated in FIG. 3.

The wavelength conversion members 540 will hereinafter be described in further detail with reference to FIG. 8. FIG. 8 is a cross-sectional perspective view of a wavelength conversion member 540 of the light source unit 500.

Referring to FIG. 8, the wavelength conversion member 540 may include a first substrate 540a, a wavelength conversion layer 540b, a second substrate 540c and a sealant 540d.

The first substrate 540a may be disposed on a mold member 530. The first substrate 540a may be formed of a material capable of blocking moisture and oxygen from permeating therethrough. In an exemplary embodiment, the first substrate 540a may be formed of an insulating material, for example, silicon oxide (SiOx), silicon nitride (SiNx) or a combination thereof. In another exemplary embodiment, the first substrate 540a may be a plastic film formed of polyethylene phthalate ("PET") or polycarbonate ("PC"). In another exemplary embodiment, the first substrate 540a may be formed of a glass material.

The first substrate 540a may include a recess pattern R. The recess pattern R may be formed in part of the first substrate 540a facing the second substrate 540c. In an exemplary embodiment, the recess pattern R may correspond to a single LED chip 520d, but the inventive concept is not limited thereto. That is, more than one recess pattern R may correspond to a single LED chip 520d.

The recess pattern R may cover the entire LED chip 520b. In an exemplary embodiment, the center of the recess pattern R may coincide with the center of the LED chip 520b, but the boundary of the recess pattern R may not necessarily coincide with the boundary of the LED chip 520b. The recess pattern R may have a size wider than the receiving groove of the LED package and the upper portion of the second opening 530a-2. In another exemplary embodiment, the recess pattern R may cover an entire LED package 520 including the LED chip 520b.

The recess pattern R may be circular in a plan view, but the inventive concept is not limited thereto. That is, the recess pattern R may be elliptical or polygonal in a plan view. The shape of the wavelength conversion layer 540b including the recess pattern R may be determined based on the planar shape of the recess pattern R.

The wavelength conversion layer 540b may be disposed on the first substrate 540a. More specifically, the wavelength conversion layer 540b may be located in the recess pattern R formed in the first substrate 540a. In an exemplary embodiment, the wavelength conversion layer 540b may completely fill the recess pattern R. In this exemplary embodiment, the top surface of the wavelength conversion layer 540b may be on a same level with the top surface of part of the first substrate 540a where the recess pattern R is not formed.

The wavelength conversion layer 540b may convert the wavelength of light incident thereupon into a longer wavelength. That is, the wavelength of the incident light may become longer than that of the wavelength of the incident light after passing through the wavelength conversion layer 540b. In an exemplary embodiment, the wavelength conversion layer 540b may convert blue light into high-purity white light.

The wavelength conversion layer 540b may have a thickness of about 300 μm to about 600 μm. In response to the wavelength conversion layer 540b having a thickness of less than 300 μm, the wavelength of light emitted from the LED chip 520b may not be fully converted by the wavelength conversion layer 540b, and as a result, the light may become bluish. On the other hand, in response to the wavelength conversion layer 540b having a thickness of greater than 600 μm, the wavelength of the light emitted from the LED chip 520b may be converted excessively by the wavelength conversion layer 540b, and as a result, the light may become yellowish.

The wavelength conversion layer 540b may include quantum dots. The quantum dots, which are semiconductor nano-particles with a core-shell structure and with a size of several nano meters to dozens of nano meters, emit different light depending on their size due to quantum confinement effects. The quantum dots can emit intense light within a narrow wavelength band. More specifically, the quantum dots generate light when unstable (or floating) electrons drop from the conduction band to the valence band. The more the size of the quantum dot decreases, the shorter the wavelength of light generated by the quantum dots becomes, and the less the size of the quantum dot decreases, the longer the wavelength of the light generated by the quantum dots becomes. Accordingly, visible light with a desired wavelength may be obtained by adjusting the size of the quantum dots.

The quantum dots may include one of silicon-based nano-crystals, II-VI group-based compound semiconductor nano-crystals, III-V group-based compound semiconductor nano-crystals, IV-VI group-based compound semiconductor nano-crystals and a mixture thereof.

The II-VI group-based compound semiconductor nano-crystals may include one selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe and HgZnSTe.

The III-V group-based compound semiconductor nano-crystals may include one selected from the group consisting of GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs.

The IV-VI group-based compound semiconductor nano-crystals may include SbTe.

The wavelength conversion layer 540b may include quantum dots of the same type. For example, the wavelength conversion layer 540b may include yellow quantum dots that convert blue light incident thereupon into yellow light, but the inventive concept is not limited thereto. That is, the wavelength conversion layer 540b may include two or more different types of quantum dots. For example, the wavelength conversion layer 540b may include red quantum dots that convert blue light incident thereupon into red light, or green quantum dots that convert the incident blue light into green light.

The wavelength conversion layer 540b may also include a dispersive medium. That is, the quantum dots may be dispersed in the dispersive medium, such as an organic solvent or a polymer resin. Any transparent medium may be used as the dispersive medium as long as it neither reflects nor absorbs light.

The organic solvent may include at least one of, for example, toluene, chloroform and ethanol, and the polymer resin may include at least one of, for example, epoxy, silicone, polystyrene and acrylate.

The wavelength conversion layer 540b may also include an ultraviolet (UV) initiator, a thermal curing additive, a cross-linking agent, a dispersing agent and a combination thereof. The wavelength conversion layer 540b may be disposed on the first substrate 540a with the quantum dots and the aforementioned additives mixed therein.

The second substrate 540c may be disposed on the wavelength conversion layer 540b. More specifically, the second substrate 540c may surround the wavelength conversion layer 540b together with the first substrate 540a.

The second substrate 540c, unlike the first substrate 540a, may not be patterned. That is, the second substrate 540c, unlike the first substrate 540a, may not include any recess pattern R.

The second substrate 540c may be formed of a material that can block moisture and oxygen from penetrating therethrough. In an exemplary embodiment, the second substrate 540c may be formed of an insulating material, for example, silicon oxide (SiOx), silicon nitride (SiNx) or a combination thereof. In another exemplary embodiment, the second substrate 540c may be a plastic film formed of PET or PC. In another exemplary embodiment, the second substrate 540c may be formed of a glass material. In another exemplary embodiment, the second substrate 540c may be formed of the same material as the first substrate 540a.

The sealant 540d may be interposed between the first substrate 540a and the second substrate 540c. More specifically, the sealant 540d may be disposed along the edges of the first substrate 540a and the second substrate 540c to seal the wavelength conversion layer 540b. The sealant 540d may be formed of a material such as glass frit, and may combine and seal the first substrate 540a and the second substrate 540c together. The sealant 540d may have a thickness of about 10 μm to about 20 μm. In an exemplary embodiment, the sealant 540d may be disposed between the first substrate 540a and the second substrate 540c, but the inventive concept is not limited thereto. The sealant 540d may cover all the sides of the first substrate 540a and the second substrate 540c, and may thus protect the wavelength conversion layer 540b from atmospheric moisture and oxygen.

The distance between the wavelength conversion member 540 and the LED chip 520b may be about 1 mm to about 1.5 mm. In response to the wavelength conversion member 540 and the LED chip 520b being less than 1 mm apart from each other, the wavelength conversion layer 540b may deteriorate due to heat generated by the LED chip 520b. On the other hand, in response to the wavelength conversion member 540 and the LED chip 520b being more than 1.5 mm apart from each other, the wavelength conversion layer 540b may not be able to properly convert the wavelength of light emitted from the LED chip 520b.

A method of fabricating the wavelength conversion member 540 will hereinafter be described with reference to FIGS. 9 to 17. FIGS. 9 to 17 are plan views or cross-sectional views illustrating a method of fabricating the wavelength conversion member 540 of FIG. 8, according to an exemplary embodiment of the inventive concept.

Figure 9:
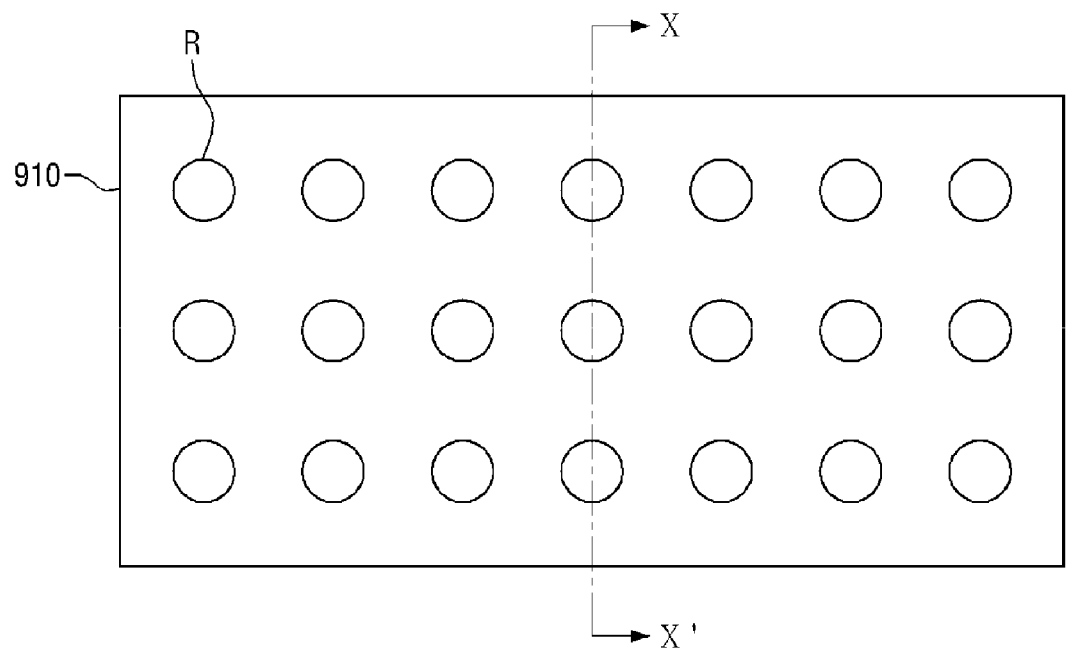
FIGS. 9 to 17 are plan views or cross-sectional views illustrating a method of fabricating the wavelength conversion member of FIG. 8, according to an exemplary embodiment of the inventive concept.
Figure 10:
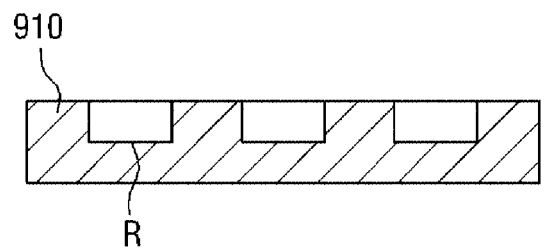

More specifically, FIG. 9 illustrates a plan view of a first mother substrate 910 on which a plurality of recess patterns R are formed, and FIG. 10 illustrates a cross-sectional view taken along line X-X' of FIG. 9. Referring to FIGS. 9 and 10, the recess patterns R may be formed on the first mother substrate 910. The first mother substrate 910 may be divided later into a plurality of first substrates 540a. In an exemplary embodiment, the recess patterns R may be arranged in a matrix, but the inventive concept is not limited thereto. That is, the recess patterns R may be arranged in various manners.

The recess patterns R may be formed by a typical photolithography process. That is, a glass substrate or film to be processed may be prepared, photoresist may be applied onto the glass substrate or film, and exposure, development, etching and cleaning may be sequentially performed on the glass substrate or film, thereby obtaining the first mother substrate 910 with the recess patterns R. However, the inventive concept is not limited to this. That is, the first mother substrate 910 with the recess patterns R may be formed by an extrusion or imprinting process.

Figure 11:
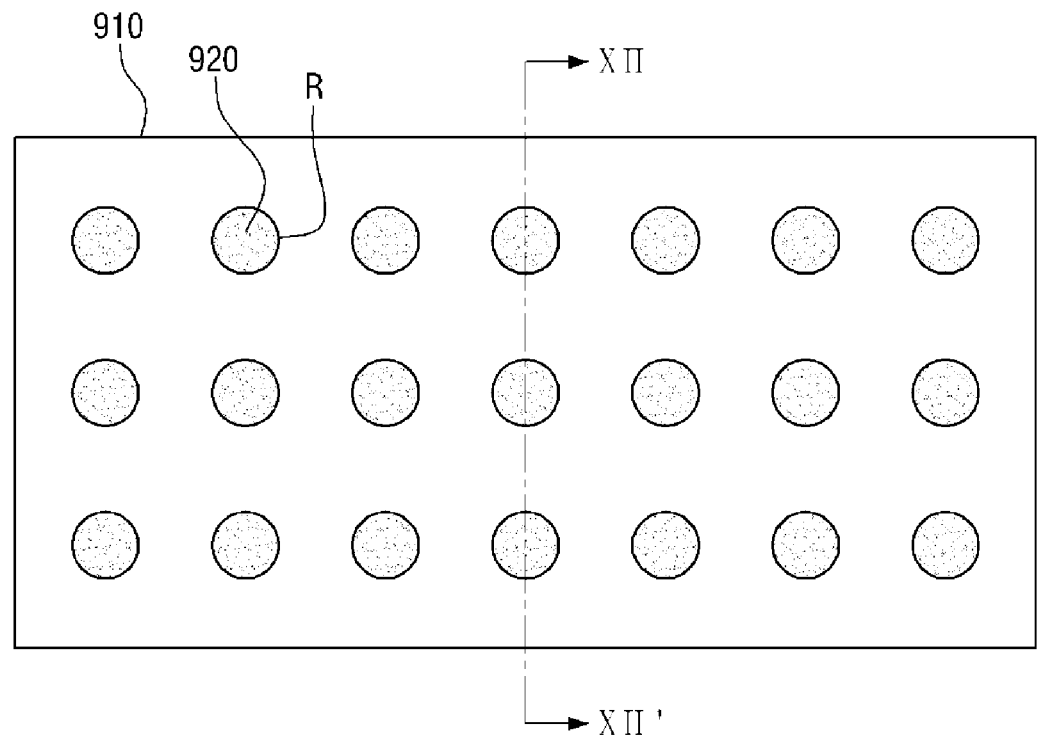
Figure 12:
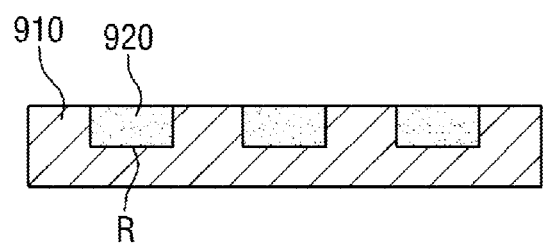

FIG. 11 illustrates a plan view of the first mother substrate 910 with a wavelength conversion material 920 filled in the recess patterns R, and FIG. 12 is a cross-sectional view taken along line XII-XII' of FIG. 11. Referring to FIGS. 11 and 12, the recess patterns R may be filled with the wavelength conversion material 920. The wavelength conversion material 920 may be formed of substantially the same material as the wavelength conversion layer 540b of FIG. 8. The wavelength conversion material 920 may be formed of a typical dispensing process. In an exemplary embodiment, the wavelength conversion material 920 may be selectively formed by an inkjet printer to fill the recess patterns R.

Figure 13:
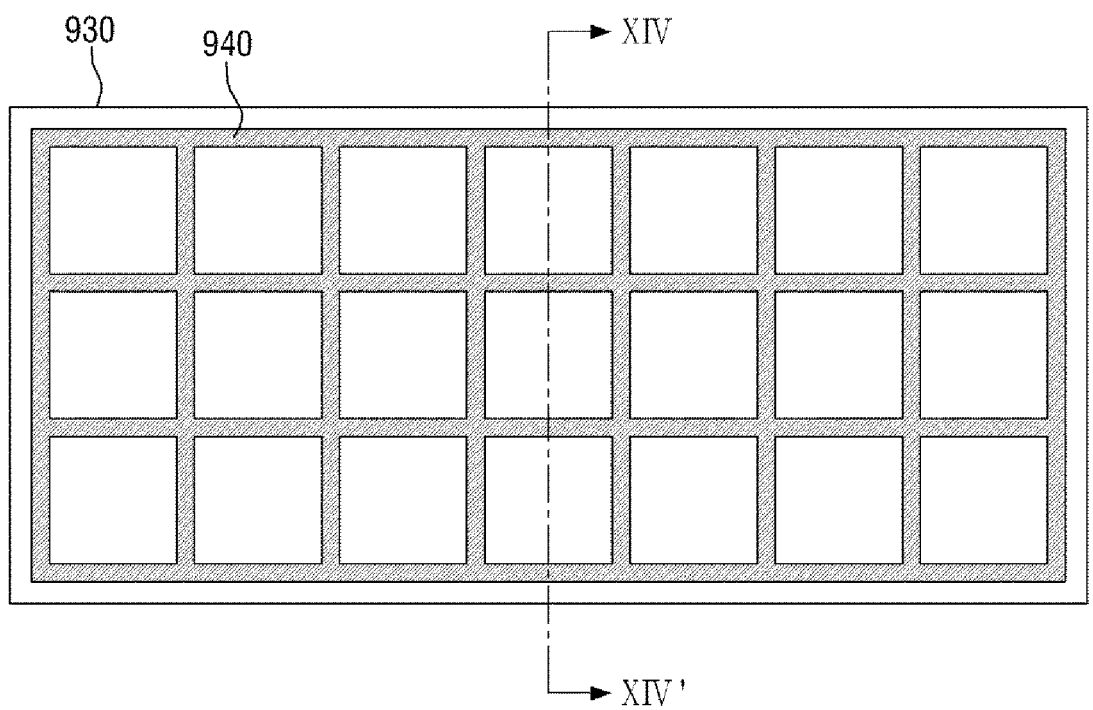
Figure 14:
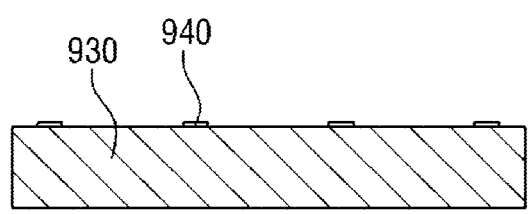

FIG. 13 illustrates a plan view of a second mother substrate 930 with a sealing member 940 formed thereon, and FIG. 14 illustrates a cross-sectional view taken along line XIV-XIV' of FIG. 13. Referring to FIGS. 13 and 14, the sealing member 940 may be applied onto the second mother substrate 930 to form a lattice pattern. The second mother substrate 930 may be divided later into a plurality of second substrates 540c. The sealing member 940 may be a sealant 540d which is cured later.

Figure 15:
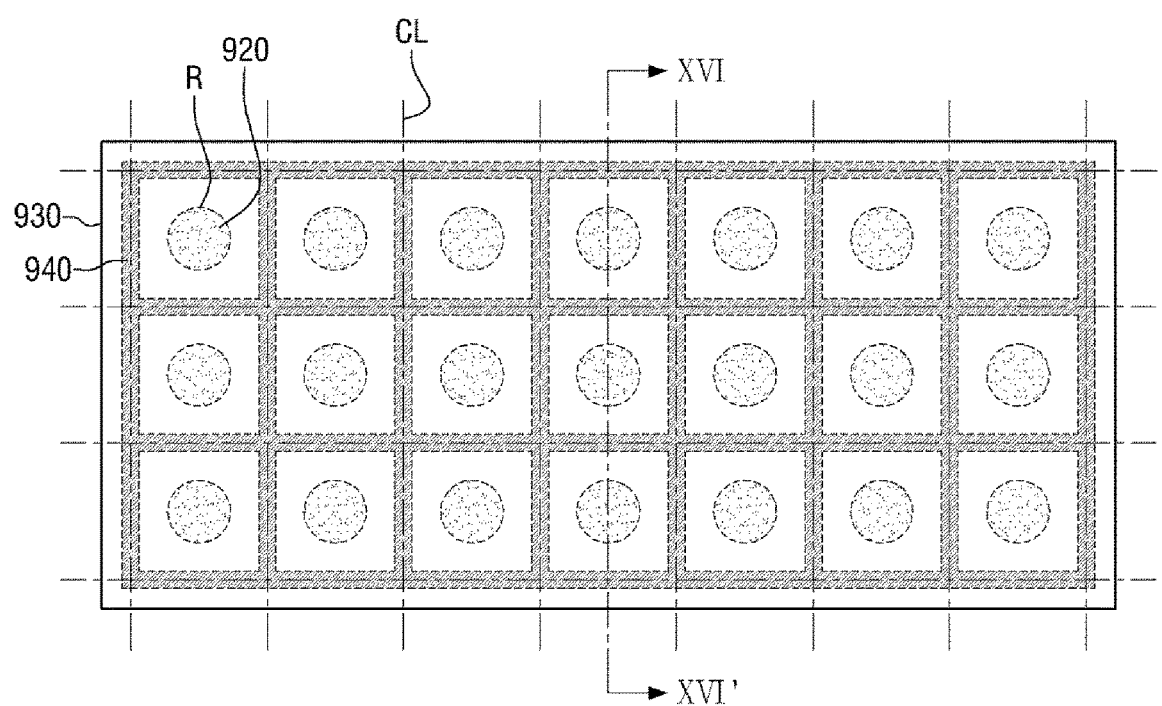
Figure 16:
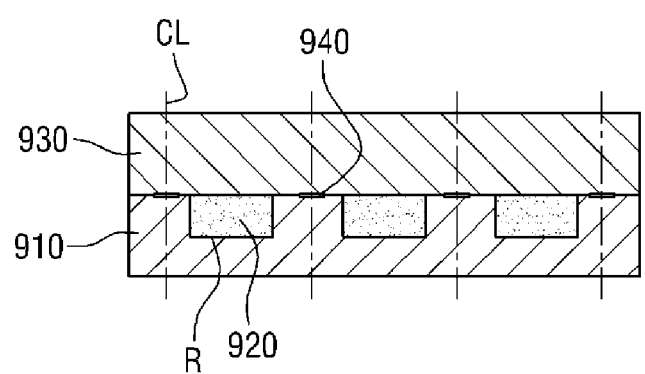

FIG. 15 illustrates a plan view of the first mother substrate 910 and the second mother substrate 930 bonded together, and FIG. 16 illustrates a cross-sectional view taken along line XVI-XVI' of FIG. 15. Referring to FIGS. 15 and 16, the first mother substrate 910 and the second mother substrate 930 may be coupled together by the sealing member 940. The sealing member 940 may surround each of the recess patterns R. Laser beams may be applied to the sealing member 940, and the first mother substrate 910 and the second mother substrate 930 may be cut along cutting lines CL. The cutting lines CL may extend along the middle of each part of the lattice pattern of the sealing member 940.

Figure 17:
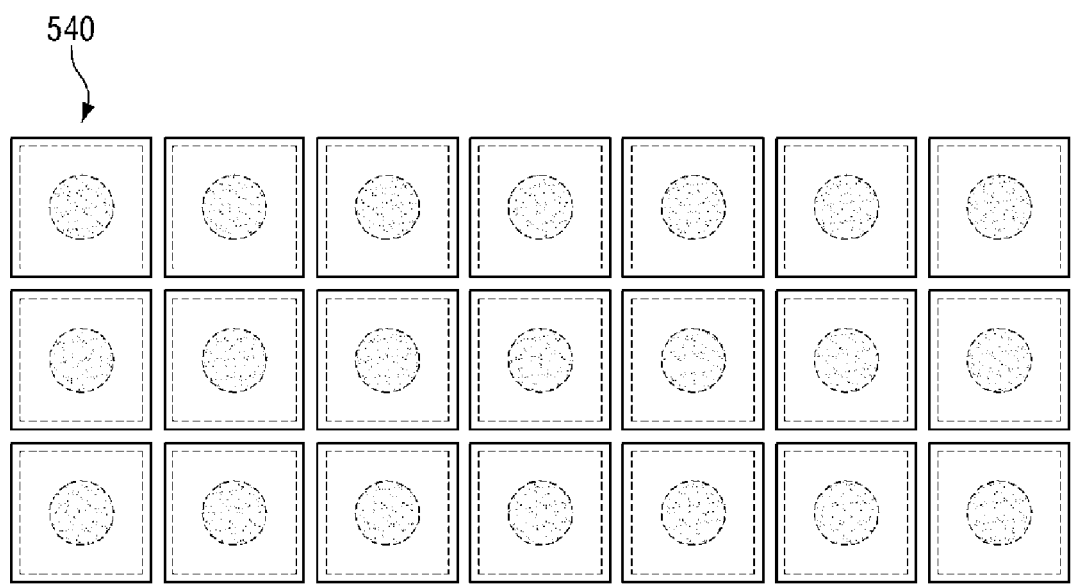

By the processes described above with reference to FIGS. 9 to 16, a plurality of wavelength conversion members 540 may be obtained, as illustrated in FIG. 17.

Figure 18:
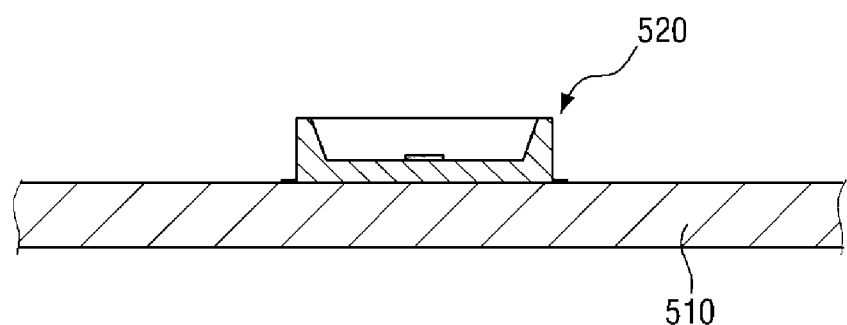
FIGS. 18 to 20 are cross-sectional views illustrating a method of fabricating the light source unit of FIG. 3, according to an exemplary embodiment of the inventive concept.
Figure 19:
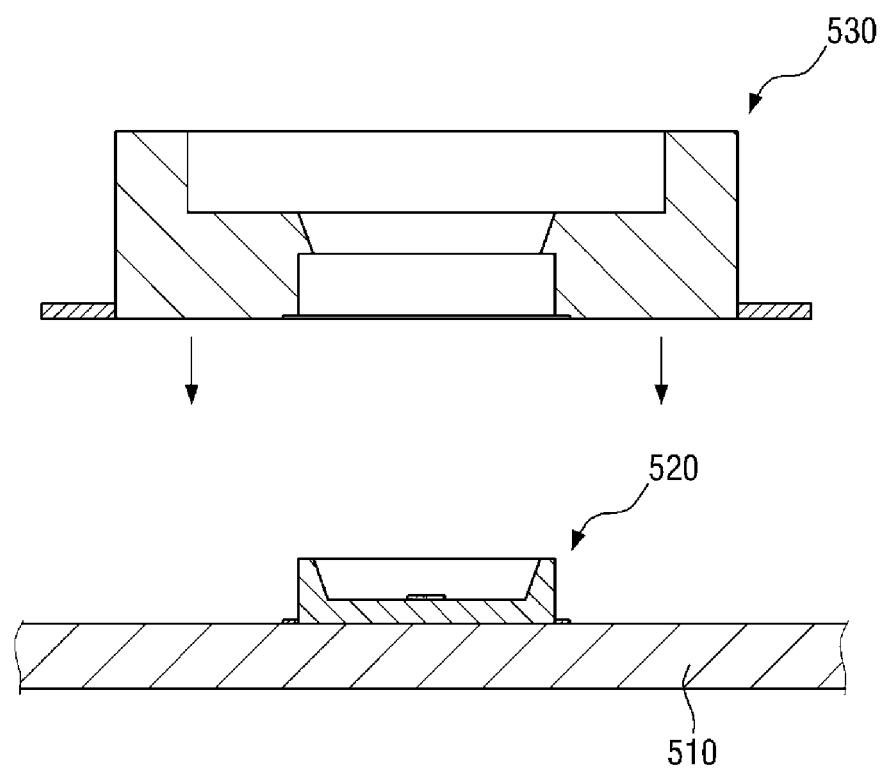
Figure 20:
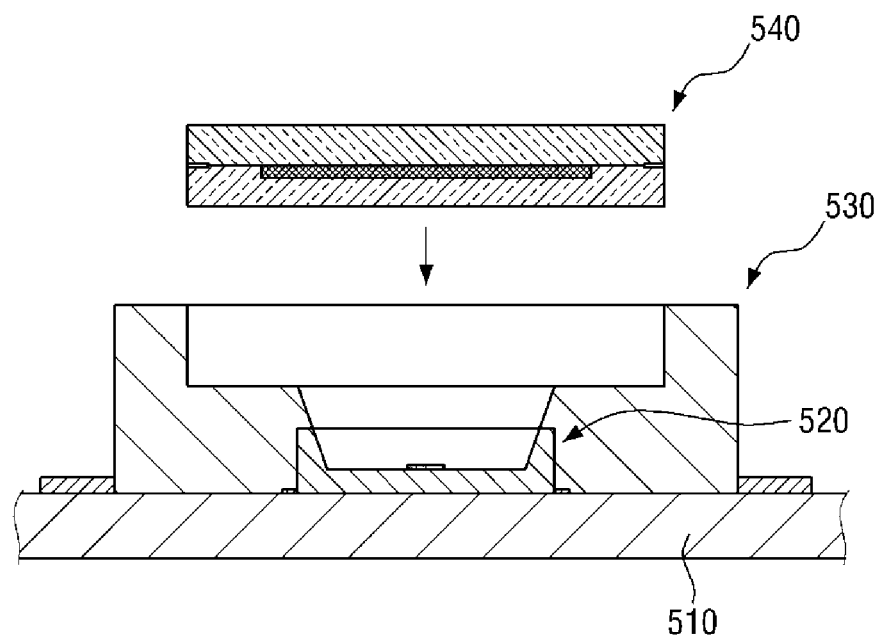

A method of fabricating the light source unit 500 of FIG. 3 will hereinafter be described with reference to FIGS. 18 to 20. FIGS. 18 to 20 are cross-sectional views illustrating a method of fabricating the light source unit 500 of FIG. 3, according to an exemplary embodiment of the inventive concept.

Referring to FIG. 18, an LED package 520 may be placed on a circuit board 510. In an exemplary embodiment, the LED package 520 may be placed and then mounted on the circuit board 510. In another exemplary embodiment, the LED package 520 and a mold member 530 may be mounted at the same time on the circuit board 510.

Referring to FIG. 19, the mold member 530 may be mounted over the LED package 520. In an exemplary embodiment, the LED package 520 may be inserted into the mold member 530, and the mold member 530 may be mounted on the circuit board 530, but the inventive concept is not limited thereto. That is, the LED package 520 and the mold member 530 may be mounted at the same time on the circuit board 510. By mounting the LED package 520 and the mold member 530 at the same time on the circuit board 510, the number of mounting processes may be reduced, and thus, the manufacturing time and cost of the light source unit 500 may decrease.

Surface mount technology ("SMT") may be used to mount the LED package 520 and the mold member 530 on the circuit board 510.

Referring to FIG. 20, a wavelength conversion member 540 may be inserted into the mold member 530. More specifically, an adhesive (not illustrated) may be interposed between the wavelength conversion member 540 and the mold member 530 to fix the wavelength conversion member 540 onto the mold member 530.

Since the light source unit 500 includes quantum dots, the light source unit 500 can provide high-purity white light to the display panel 200. Also, since only the mold member 530 and the wavelength conversion member 540 are provided on the LED package 520, the light source unit 500 can be manufactured by existing manufacturing equipment. Also, by using SMT, the wavelength conversion member 540, which includes the quantum dots, can be easily fixed onto the LED package 520. Also, since the quantum dots are sealed with a first substrate 540a, a second substrate 540c and a sealant 540d of the wavelength conversion member 540, the quantum dots can be effectively protected from atmospheric oxygen and moisture. Also, since the quantum dots are apart from a heat source, i.e., an LED chip 520b of the LED package 520, the quantum dots can be prevented from deteriorating. Also, since the quantum dots are provided only on the LED package 520, the amount of quantum dots, which are relatively expensive, can be minimized.

Figure 21:
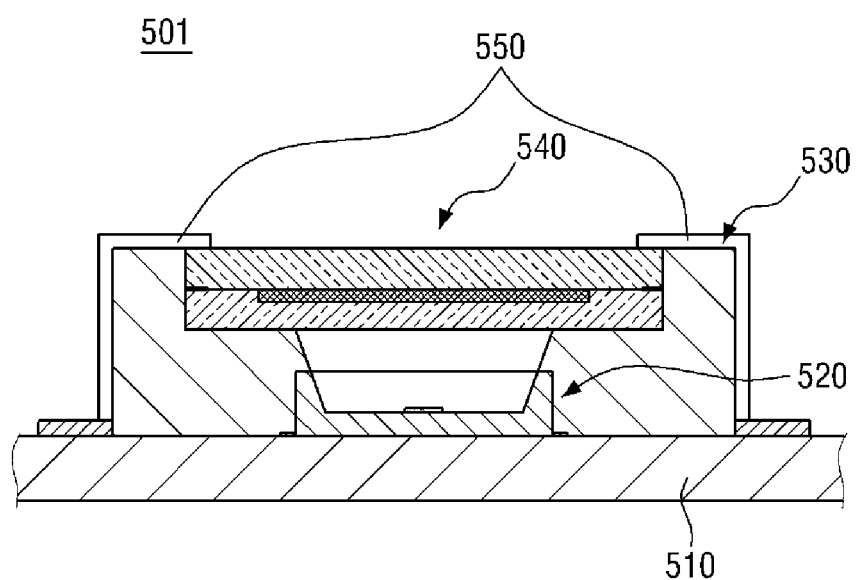
FIG. 21 is a cross-sectional view of a light source unit according to another exemplary embodiment of the inventive concept.

FIG. 21 is a cross-sectional view of a light source unit according to another exemplary embodiment of the inventive concept. In FIGS. 5 and 21, like reference numerals indicate like elements, and thus, detailed descriptions thereof will be omitted.

Referring to FIG. 21, a light source unit 501, unlike the light source unit 500 of FIG. 5, may include a fixing member 550 for fixing a wavelength conversion member 540. In an exemplary embodiment, the fixing member 550 may be a bracket, but the inventive concept is not limited thereto. The fixing member 550 may stably fix the wavelength conversion member 540 within a mold member 530 by covering the sides of the mold member 530 and the edges of the wavelength conversion member 540. The wavelength conversion member 540 and the mold member 530 may have no adhesive interposed therebetween.

Figure 22:
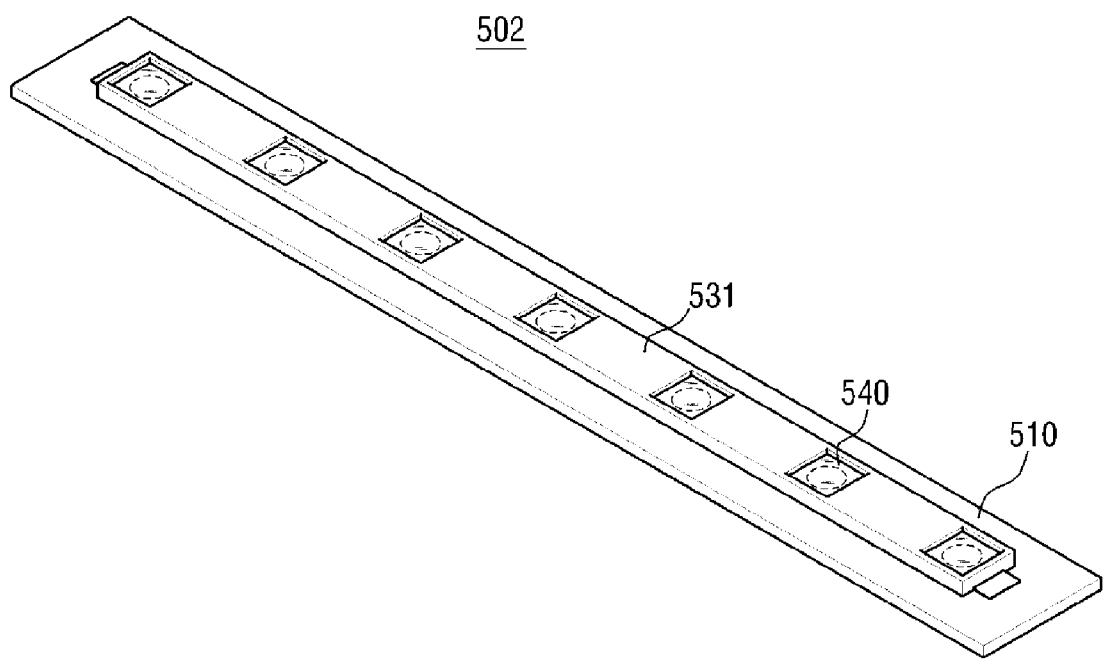
FIG. 22 is a perspective view of a light source unit according to another exemplary embodiment of the inventive concept.

FIG. 22 is a perspective view of a light source unit according to another exemplary embodiment of the inventive concept. In FIGS. 5 and 22, like reference numerals indicate like elements, and thus, detailed descriptions thereof will be omitted.

Referring to FIG. 22, a light source unit 502 may include a mold member 531 which covers a plurality of LED packages 520. That is, the mold member 531 may correspond to the LED packages 520 and a plurality of wavelength conversion members 540. Adopting the light source unit 502 including a single mold member 531, the manufacturing cost and time of the light source unit 502 may decrease.

While the inventive concept has been particularly shown and described with reference to exemplary embodiments thereof, it will be understood by those of ordinary skill in the art that various changes in provided and detailed embodiments may be made without departing from the spirit and scope of the inventive concept as defined by the following claims. The exemplary embodiments should be considered in a descriptive sense only and not for purposes of limiting the scope of the inventive concept.

What is claimed is:

1. A light source unit, comprising:
a circuit board;
a light-emitting diode ("LED") package configured to be disposed on the circuit board and including an LED chip emitting light, the LED package including a package mold disposed on the circuit board and having a receiving groove receiving the LED chip;
a wavelength conversion member configured to be disposed on the LED package and convert the wavelength of light emitted from the LED chip; and
a mold member configured to be interposed between the LED package and the wavelength conversion member and support the wavelength conversion member,
wherein the mold member directly contacts a top surface of the LED package,
wherein the mold member includes a first opening disposed between the circuit board and the wavelength conversion member, the first opening accommodating the LED package therein, and a second opening disposed between the first opening and the wavelength conversion member and extended from the first opening, and wherein a side surface of the second opening and a side surface of the receiving groove are disposed on a same plane.

2. The light source unit of claim 1, wherein the mold member further includes a third opening disposed above the second opening and extended from the second opening and the third opening accommodates the wavelength conversion member therein.

3. The light source unit of claim 1, wherein the LED chip emits blue light.

4. The light source unit of claim 1, wherein the wavelength conversion member includes quantum dots.

5. The light source unit of claim 1, wherein the wavelength conversion member converts light emitted from the LED chip into white light.

6. The light source unit of claim 1, wherein the wavelength conversion member includes:
a first substrate disposed on the mold member;
a second substrate disposed on the first substrate; and
a wavelength conversion layer disposed between the first substrate and the second substrate.

7. The light source unit of claim 6, wherein at least one of the first substrate and the second substrate includes a recess pattern disposed above the LED chip and the wavelength conversion layer is located in the recess pattern.

8. The light source unit of claim 6, wherein the wavelength conversion member further includes a sealant disposed between the first substrate and the second substrate and surrounding the wavelength conversion layer.

9. The light source unit of claim 1, further comprising:
a fixing member configured to be disposed along edges of the mold member and the wavelength conversion member and fix the wavelength conversion member.

10. A method of fabricating a light source unit, comprising:
placing an LED package, which includes an LED chip emitting light and a package mold having a receiving groove which receives the LED chip, on a circuit board;
inserting a mold member onto the LED package to directly contact a top surface of the LED package; and
inserting a wavelength conversion member, which converts the wavelength of light emitted from the LED chip, into the mold member,
wherein the mold member includes a first opening disposed between the circuit board and the wavelength conversion member, the first opening accommodating the LED package therein, and a second opening disposed between the first opening and the wavelength conversion member and extended from the first opening, and
wherein a side surface of the second opening and a side surface of the receiving groove are disposed on a same plane.

11. The method of claim 10, further comprising, after the placing the LED package:
mounting the LED package on the circuit board.

12. The method of claim 10, further comprising, after the inserting the mold member:
mounting the LED package and the mold member at the same time on the circuit board.

13. The method of claim 10, further comprising, before the inserting the wavelength conversion member:
preparing the wavelength conversion member,
wherein the preparing the wavelength conversion member, comprises:
forming a plurality of recess patterns on a first mother substrate, the recess patterns being arranged in a matrix;
filling the recess patterns with a wavelength conversion material including quantum dots.

14. The method of claim 13, wherein the preparing the wavelength conversion member, further comprises:
forming a sealing member in a lattice pattern on a second mother substrate; and
combining the first mother substrate and the second mother substrate by interposing the sealing member therebetween, and
each of the recess patterns is surrounded by the sealing member.

15. The method of claim 14, wherein the preparing the wavelength conversion member, further comprises:
applying laser beams to the sealing member; and
cutting the first mother substrate and the second mother substrate along the middle of each part of the sealing member.

16. A backlight assembly, comprising:
a light source unit configured to emit light; and
a container configured to accommodate the light source unit therein,
wherein the light source unit comprises:
a circuit board configured to be disposed on the container;
an LED package configured to be disposed on the circuit board and including an LED chip emitting light and a package mold having a receiving groove which receives the LED chip;
a wavelength conversion member configured to be disposed on the LED package and convert the wavelength of light emitted from the LED chip; and
a mold member configured to be interposed between the LED package and the wavelength conversion member and support the wavelength conversion member,
wherein the mold member directly contacts a top surface of the LED package,
wherein the mold member includes a first opening disposed between the circuit board and the wavelength conversion member, the first opening accommodating the LED package therein, and a second opening disposed between the first opening and the wavelength conversion member and extended from the first opening, and
wherein a side surface of the second opening and a side surface of the receiving groove are disposed on a same plane.

17. The backlight assembly of claim 16, further comprising:
a light guide panel or a diffusion plate configured to be disposed above the light source unit.

* * * * *